United States Patent
Volk

[11] Patent Number: 5,857,475
[45] Date of Patent: Jan. 12, 1999

[54] OPTICAL COMPONENT CLEANING APPARATUS

[75] Inventor: Donald A. Volk, Mentor, Ohio

[73] Assignee: Volk Optical, Inc., Mentor, Ohio

[21] Appl. No.: 807,988

[22] Filed: Mar. 3, 1997

[51] Int. Cl.⁶ .................................................. B08B 3/02
[52] U.S. Cl. ........................... 134/153; 34/58; 134/158; 134/901
[58] Field of Search ................... 134/153, 157, 134/158, 901, 902; 34/58; 210/361; 118/52

[56] References Cited

U.S. PATENT DOCUMENTS

| | | |
|---|---|---|
| 4,161,356 | 7/1979 | Giffin et al. .......................... 134/153 X |
| 4,202,071 | 5/1980 | Scharpf . |
| 4,341,568 | 7/1982 | Christensen . |
| 4,365,383 | 12/1982 | Bartlett . |
| 4,637,146 | 1/1987 | Motoki et al. ............................... 34/58 |
| 4,651,440 | 3/1987 | Karl ............................................. 34/58 |
| 4,700,729 | 10/1987 | Thaler . |
| 4,733,428 | 3/1988 | Malinge et al. . |
| 4,784,167 | 11/1988 | Thomas et al. . |
| 4,788,994 | 12/1988 | Shinbara ............................... 134/153 X |
| 4,820,351 | 4/1989 | Hambleton et al. . |
| 5,129,410 | 7/1992 | Ifejika . |
| 5,156,175 | 10/1992 | Jones . |
| 5,208,795 | 5/1993 | Lavinsky et al. . |
| 5,235,995 | 8/1993 | Bergman et al. .................... 134/157 X |
| 5,322,079 | 6/1994 | Fukutomi et al. ....................... 134/153 |
| 5,421,056 | 6/1995 | Tateyama et al. .................. 134/153 X |
| 5,706,843 | 1/1998 | Matsuo .................................... 134/153 |

OTHER PUBLICATIONS

Discwasher CD Hydrobath Instruction Manual, Recoton Corp., 1992.

*Primary Examiner*—Philip R. Coe
*Attorney, Agent, or Firm*—Venable; Robert Kinberg

[57] ABSTRACT

An apparatus and method for cleaning an optical component having opposed lens surfaces and an outer peripheral area. The apparatus includes a rotatable holder for supporting and retaining the optical component via the outer peripheral area so that at least a useful optical area of at least one of the opposed surfaces is fully exposed to air when the holder and optical component are rotated. A drive device is provided coupled to the holder for rotatably driving the holder to centrifugally force a liquid from the surface. The method includes the steps of, positioning the optical component within a holder and retaining the optical component in a region of the outer peripheral edge so that at least a useful optical area of one of the surfaces is fully exposed to air, applying a liquid to the exposed surface of the optical component, and spinning the optical component at a high rate of speed to clean and dry the optical component.

27 Claims, 5 Drawing Sheets

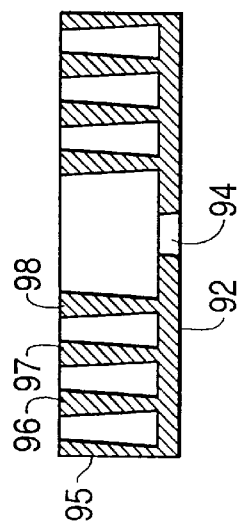
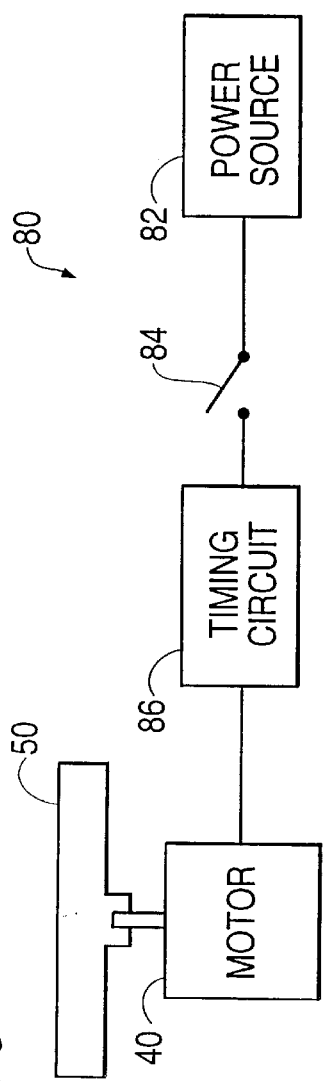
FIG. 5
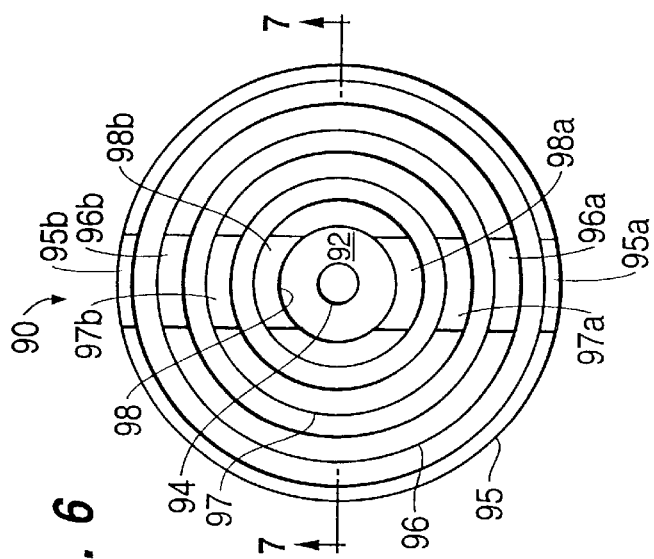
FIG. 7
FIG. 6

OPTICAL COMPONENT CLEANING APPARATUS

BACKGROUND OF THE INVENTION

The present invention relates to an apparatus and process for cleaning optical components. More particularly, the invention relates to an apparatus and process for cleaning optical components including ophthalmic lenses, telescope lenses, instrument lenses, camera lenses, optical filters, mirrors and ophthalmoscopic lenses used to examine and laser treat the eye fundus and anterior chamber angle (hereafter collectively referred to as "optical lens" or "lens") wherein the apparatus and process provide more consistently clean and residue free surfaces compared to other cleaning systems presently available.

Ophthalmoscopic lenses are commercially available in both contact and non-contact designs and may comprise one or more optical elements. Such lenses are described in various United States patents, including for example, U.S. Pat. Nos. 4,738,521 and 5,046,836, both to Volk. Ophthalmoscopic lenses have opposed exposed front and back surfaces through which illumination as well as image forming light rays pass. The lenses are generally designed to be hand-held and are therefore mounted in a tubular or frusto-conically shaped retaining ring or housing. Such a holding arrangement allows the practitioner or, in the surgical environment, the physician's assistant to handle the lens without touching the lens surfaces.

Telescope lenses, instrument lenses, camera lenses, and filters also have exposed front and back surfaces. Such lenses are frequently mounted in a similar tubular housing or ring.

It is a common experience and problem that dust, dirt and grime may collect on one or both of the exposed surfaces of a lens. However, an optical surface substantially free from debris or other contaminants is highly desirable to obtain optimum lens performance while avoiding glare, image distortion, and transmission loss. As such, many lenses, and especially ophthalmoscopic lenses, which are generally used in conjunction with intense illumination sources, are often cleaned before use.

Optical lenses which are anti-reflective coated, as well as surfaces which are coated to perform as filters or mirrors, are cleaned with evaporating solvents or ultrasonic cleaning systems prior to the thin film vacuum deposition process. Such cleaning systems are costly to use and do not always adequately prepare the surface for thin film deposition, especially larger surfaces which are more difficult to handle.

Lint free cleaning cloths and alcohol, acetone, or other chemically based cleaning solutions are commercially available to the end user for cleaning coated and uncoated optical surfaces of the types previously mentioned. However, despite the name, lint-free cleaning cloths typically will leave some lint and residue on the optical surface which remains once the surface has dried. Furthermore, constant cleaning of an optical surface with a cloth-type cleaner may scratch the optical surface or coating and degrade the performance of the optical component.

SUMMARY OF THE INVENTION

It is therefore an object of the present invention to provide an apparatus for cleaning and drying the surfaces of an optical component (such as optical lenses and optical mirrors) free of the lint, residue and foreign matter that normally remains when using a cloth wipe, brush or other contacting cleaning utensil.

It is another object of this invention to provide an apparatus and method for cleaning and drying surfaces of an optical lens in a manner such that scratching of the optical surface or coating is reduced or eliminated.

The above and other objects are accomplished according to the invention by the provision of an apparatus comprising: a rotatable optical component holder including means for supporting and retaining the optical component via the outer peripheral area so that at least a useful optical area of at least one of the opposed surfaces is fully exposed to air; and drive means coupled to the holder for rotatably driving the holder for centrifugally forcing a liquid from the exposed surface.

The apparatus further includes a high-speed motor mounted in a housing and having an output drive shaft connected to the rotatable holder, the holder being removably mounted for rotation on the drive shaft. Upon high speed rotation of the lens within the holder, centrifugal force dispels cleaning solutions and/or final rinse solutions from each exposed surface.

Typically, the optical component, which may comprise a lens, may be washed separately or within the apparatus as part of the entire cleaning process. In either case, the final rinsing and/or drying operations can be performed within the device through the high speed rotational arrangement.

If the lens is to be separately washed by hand, a suitable cleaning solution may be applied to each of its surfaces which then may be gently scrubbed with a soft compliant sponge and initially rinsed. The lens may be subsequently transferred to the apparatus where the surfaces are again rinsed and simultaneously dried entirely free of lint, soap solutions or other residue.

Alternatively, the application of a soap-type cleaning solution or surfactant can be carried out in the apparatus during a first high speed rotation cycle through the use of a time controlled pump device. A second drying cycle may be carried out in the same apparatus by stopping the flow of cleaning solution and allowing the lens to dry through the activity of centrifugal force and air flow as described above.

The invention will be described below in greater detail in connection with embodiments thereof that are illustrated in the drawing figures.

BRIEF DESCRIPTION OF THE DRAWINGS

FIG. 5 is a schematic diagram illustrating a control circuit for an apparatus according to the invention.

FIG. 6 is a top-plan view of an alternate embodiment of the lens holder.

FIG. 7 is a vertical sectional view taken along line 7—7 of FIG. 6.

DETAILED DESCRIPTION OF THE INVENTION

Referring to FIGS. 1–4, an apparatus according to a first embodiment of the invention is illustrated. The apparatus is used for cleaning and drying of an optical lens 12, with a cleaning solution previously applied thereto. The cleaning solution may be, for example, an aqueous solution of a mild detergent and/or a surfactant. The optical lens may be an ophthalmoscopic lens or a camera lens, for example. A representative ophthalmoscopic lens is shown and described, for example, in U.S. Pat. No. 4,738,521 to Volk.

Figure 4:
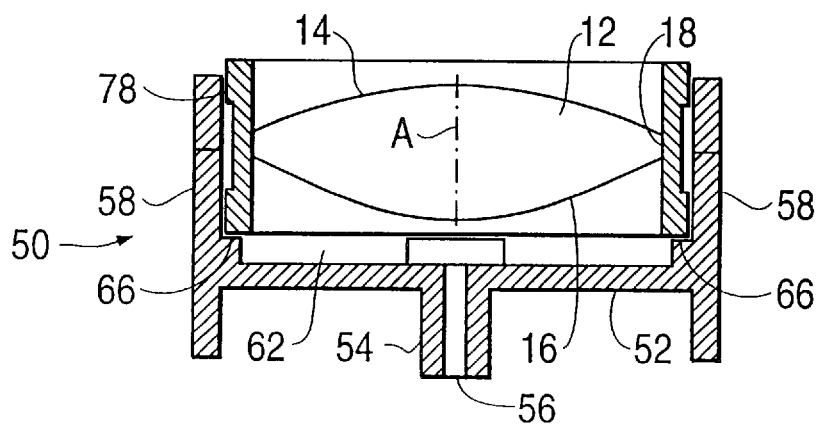
FIG. 4 shows an optical lens received in the lens holder as shown in FIG. 3.

As shown in FIG. 4, lens 12 has an optical axis A extending therethrough, oppositely positioned first and second lens surfaces 14 and 16, and a cylindrical, peripheral edge 18 which extends from the first lens surface 14 to the second lens surface 16. Lens 12 is made to transmit light incident thereon in a particular manner, with the surfaces 14 and 16 refracting light as is well-known in the art.

Figure 1:
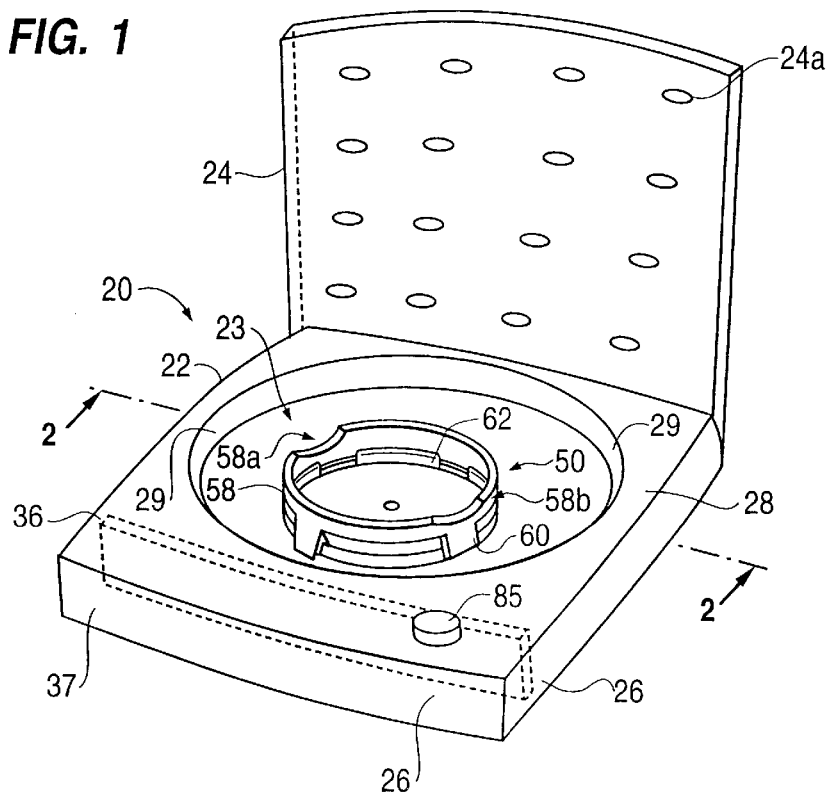
FIG. 1 is a perspective view of an apparatus according to a first embodiment of this invention, showing the apparatus in an open configuration.
Figure 2:
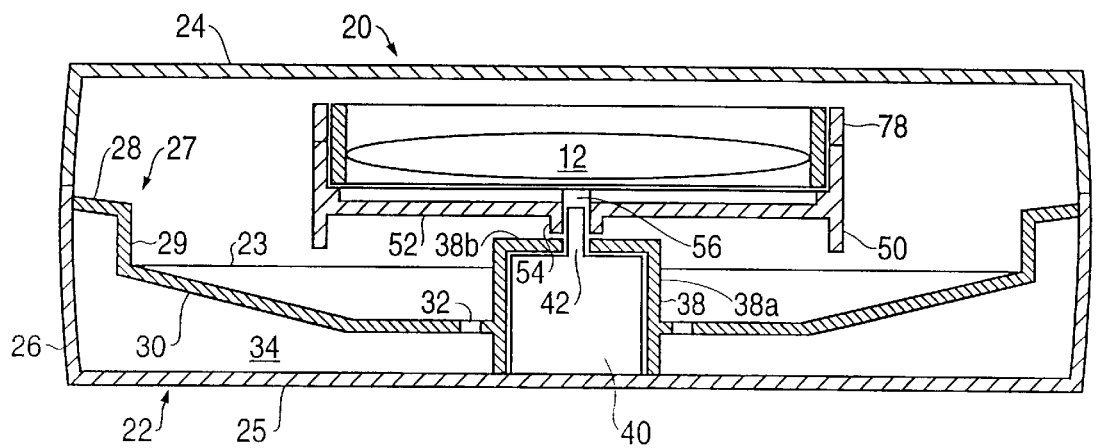
FIG. 2 is a vertical sectional view of the apparatus of the invention, taken along line 2—2 of FIG. 1, and showing the apparatus in a closed configuration.

FIGS. 1 and 2 illustrate a lens cleaning apparatus 20 which comprises a housing including a base member 22. Base member 22 forms an interior space having a recessed area 23 therein. Recessed area 23 is typically circular.

The housing further may include a lid 24. Lid 24 is preferably hingedly connected to base member 22 for pivotal movement between an open position shown in FIG. 1, and a closed position shown in FIG. 2. Alternatively, lid 24 may be removably secured to base member 22. Lid 24 may be perforated with holes 24A, to provide aeration and ventilation of the interior space as shown in FIG. 2 when closed.

Base member 22 and lid 24 may be of any desired shape or size to accommodate the types of optical lenses to be cleaned. However, in general, base member 22 has a bottom wall 25, which may be rectangular, and at least one upstanding side wall, which may comprise four side walls 26. Further, lid 24 conforms to the shape of base 22, so that recessed area 23 may be enclosed.

Base member 22 and lid 24 are made of a rigid and preferably non-conductive material. A molded plastic (preferably one having high impact strength) is preferred although metal or another material may be used.

As illustrated in FIG. 2, an inside wall 27 forms the recessed area 23 in base member 22. Inside wall 27 typically includes an upper shelf 28, a downwardly extending and essentially cylindrical shaped inside wall surface 29, and a generally frustoconical baffle 30. The upper shelf 28 intersects the side walls 26, and along with the baffle 30, may be inclined downwardly toward the center of the apparatus. The baffle 30 extends from the inside wall surface 29 toward the center of the base member 22. A plurality of drainage openings 32 are arranged at an inner circular region of baffle 30.

The inside wall 27 divides the interior of base member 22 into two compartments, i.e., a sump 34 for collection of cleaning liquid below the baffle 30, and an upwardly open interior space above the baffle, i.e., recessed area 23. The inclined upper shelf 28 and baffle 30 urge excess cleaning fluid thrown from the lens during the cleaning operation from the circumference of the lens cleaning apparatus towards and below its center area. The excess cleaning fluid flows through openings 32, and is collected in sump 34.

A vertical partition 36, shown in FIG. 1, may be provided to separate the sump 34 from a dry interior space 37 where electrical components (shown diagrammatically in FIG. 5) may be housed.

A motor housing 38 located at the center of the base member 22 provides a dry and water-tight enclosure for an electric motor 40. Motor housing 38 extends upwardly from the bottom wall 25 of base member 22, and includes a side wall 38a and top wall 38b. Electric motor 40 has a motor output drive shaft 42 extending outwardly through the top wall 38b of the motor housing for mounting of a lens holder 50. The motor 40 can rotate the output drive shaft 42 at high-speeds, for example about 8,000 revolutions per minute (rpm). The drive shaft 42 rotates about a vertical axis, which is preferably at the geometrical center of the housing. The holder 50 for receiving and retaining optical lens 12 has a generally cylindrical shape and may be removably mounted on drive shaft 42 for rotation in the housing. The holder 50, when so mounted, is in direct drive engagement with the drive shaft 42, and rotates about the vertical axis of the drive shaft.

Figure 3:
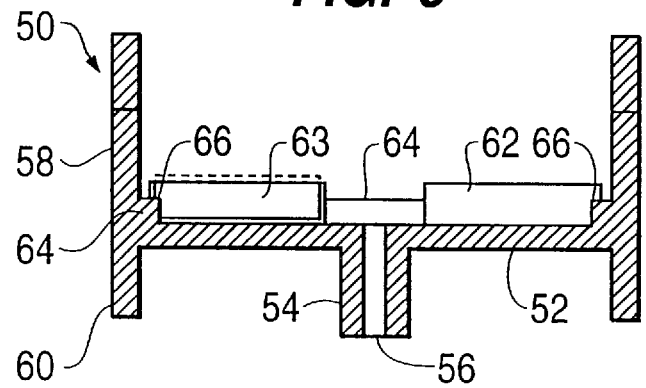
FIG. 3 is an enlarged sectional view of a lens holder according to the invention.

As shown in FIGS. 3 and 4, in a first preferred embodiment holder 50 comprises a flat, horizontally arranged circular base plate 52 from which a downwardly projecting central boss 54 surrounds a central bore 56 located at a central axis of the holder. Central bore 56 receives drive shaft 42 for direct drive engagement between motor 40 and holder 50. Holder 50 further comprises an annular sidewall 58 which extends upwardly from a periphery of horizontal base plate 52.

A plurality of symmetrically spaced legs 60 (two, for example) may be provided to extend downwardly from the periphery of base plate 52. Legs 60 serve to lower the center of gravity of holder 50. Lowering the center of gravity helps to stabilize holder 50, thus minimizing wobble during high-speed rotation.

A plurality of vent openings 62 (four are shown) may be formed, for example, in sidewall 58 adjacent base plate 52. Vent openings 62 are important to achieve proper air flow and ventilation for cleaning and drying the lower lens surface.

Various vent configurations may be provided. For example, the vents may be of alternate shapes, dimensions and positions. For example, the vent openings may be located in base plate 52. The primary criteria in selecting the shapes and positions of the vent openings is that air, both fresh and moisture laden, be able to flow across and away from the surface of the lens continuously during the cleaning process.

As shown in FIG. 3, vent openings 62 may also include, for example, movable shutters 63 to close or partially close the respective vent openings so that the air flow characteristics under the lens can be modified. In this Figure, only one of the vent openings is illustrated as having a movable shutter. However, it is to be understood that this is for illustration only, and all vents may be similarly provided. Alternatively, instead of shutters 63, a plurality of upstanding vanes (not shown) arranged in a pattern, or a device to deflect air onto base plate 52 may be provided.

Between adjacent vent openings 62, sidewall 58 is continuous, forming connecting members 64. Each connecting member 64 may include a support internal to holder 50 for supporting a lens, lens housing or mounting ring above base plate 52. For example, the support may comprise a horizontal shoulder 66 formed in association with connecting members 64. Shoulders 66 are coplanar for seating of the optical lens so that the lower surface of the lens is spaced from (and out of touching engagement with) base plate 52, with the result that both surfaces of the lens are completely exposed to air over their entire areas.

Referring again to FIG. 4, lens 12 is preferably mounted in an essentially cylindrical mounting ring 78 which surrounds the peripheral edge 18 of the lens. The mounting ring permits a user to handle the lens without touching its surface.

In a preferred embodiment, lens 12 is mounted in mounting ring 78, and the resulting assembly is placed in holder 50 as shown in FIG. 4. Sidewall 58 of holder 50 may frictionally engage mounting ring 78 to hold the lens 12 in position for rotation. Alternatively, sidewall 58 may be designed approximately 0.003" larger than mounting ring 78 (or, the lens 12, if no mounting ring is used) so that ring 78 is easily inserted into or removed from holder 50 while maintaining proper centering of the lens 12. The lens assembly will remain in holder 50 by gravitational force. Finger cut outs (recesses) 58a and 58b may be provided in sidewall 58 for easy insertion or removal of the lens assembly in holder 50. When supported in holder 50, the optical axis A of lens 12 is substantially aligned with the axis of rotation of the holder 50 and the drive shaft 42 of motor 40. Mounting ring 78 rests on shoulders 66 of holder 50, with the second (lower) lens surface 16 spaced from the base plate 52. In this way the entire second lens surface 16, as well as the entire first (upper) lens surface 14, is exposed to air. Vent openings 62 provide access for the air to enter and escape from the region between lens 12 and base plate 52.

An electrical system 80 controls the operation of the apparatus, and is shown diagrammatically in FIG. 5. The electrical system comprises a power source 82, an on-off switch 84 which may be controlled by a switch actuator (e.g., a start button) 85, as shown in FIG. 1, a timing circuit 86, and electric motor 40.

The timing circuit 86 controls the duration of high-speed rotation of the motor drive shaft 42 during the cleaning cycle in the apparatus. The duration of the cleaning cycle can be varied depending on the type of lens being cleaned, and can be adjusted if desired. Except for start button 85, the entire electrical system is typically housed within base member 22. The power source 82 may be a battery power supply or AC line voltage.

A modified lens holder 90 is shown in FIGS. 6 and 7. This modified lens holder is convenient when a variety of different size lenses are to be cleaned. Lens holder 90 is adjustable to correspond to the outside diameter of the mounting ring 78 of the lens to be cleaned (or to the diameter of the lens if no mounting ring is used).

Lens holder 90, preferably made of a rigid molded plastic, comprises a circular base plate 92 having a central opening 94 which allows the lens holder to be mounted to the drive shaft 42 as previously discussed. Lens holder 90 may have a plurality of concentric, upstanding sidewalls 95, 96, 97, and 98, each of which is cylindrical and coaxial with the axis of rotation of lens holder 90. Typically, the outermost sidewall 95 is at the outer circumference of plate 92.

The sidewalls 95–98 may be tapered inwardly from their distal free end to allow a lens mounting ring (not shown) to be frictionally engaged at its highest point above base plate 92. Each sidewall will also preferably include vent openings, similar to vent openings 62 in FIGS. 1 and 3, to allow air to flow beneath the lens. Moreover, sidewalls 95–98 may be provided with finger cut-outs or recesses 95a, 95b–98a, 98b, in a manner as previously described.

When a user of the apparatus 20 wishes to clean a lens, he or she determines which of the sidewalls 95, 96, 97, or 98 has an inside diameter which matches the outside diameter of the lens to be cleaned, and breaks away the other sidewall members. Since the sidewall members are tapered inwardly, the connection between the respective sidewall and the base plate 92 is relatively thin, thus allowing for easy removal of the sidewall. The lens or lens mounting ring is then positioned in the receiving area above base plate 92.

Various modifications can be made to lens holder 90. For example, a downwardly extending projection or boss, similar to boss 54 of lens holder 50, may be provided to allow for a longer bore for receiving drive shaft 42. Also, a plurality of legs, similar to legs 60 of lens holder 50, may be provided for greater stability. Furthermore, individual inserts specifically designed to hold lenses, lens rings or housings of specific diameters may removably fit outer most wall portion 58 of holder 50 as an alternative to the use of the selectable side walls of holder 90.

Operation of the apparatus shown in FIGS. 1–4 is as follows:

First, lens 12, which may be mounted in mounting ring 78, has a suitable cleaning or rinse solution applied to surfaces 14 and 16. The wet lens 12 is then placed in the appropriate insert and lens holder 50 or 90. The lens holder 50, 90 is mounted on motor drive shaft 42, lid 24 is closed, and the user depresses the switch actuator 85 to initiate operation.

When switch actuator 85 is actuated, on-off switch 84 is closed. The timing circuit 86 controls energization of drive motor 40 for rotating drive shaft 42, lens holder 50, 90, and lens 12 at a relatively rapid rotational speed, for example 8,000 rpm. The duration of the rotation cycle (which cleans and dries the lens) is pre-programmed in the timing circuit 86.

The high-speed rotation causes the cleaning or rinse solution adhering to the lens surfaces 14 and 16 to flow radially and circumferentially outwardly over the surface. The flow of the solution cleans the surfaces while being urged off the surfaces. Further, air flow and the generated centrifugal force cleans and dries the lens surfaces in a non-contact manner, i.e., without the use of a cloth or the like. Vents 62 allow the solution to escape into recessed area 23 and flow down the surfaces 28, 29, and 30, where it subsequently drains through openings 32 into sump 34.

At the conclusion of the rotation cycle, timing circuit 86 shuts off drive motor 40 from power source 82, thereby allowing the lens holder and lens 12 to spin to a halt. When spinning has stopped, lid 24 is opened and lens 12 (and mounting ring 78, if used) is removed from the lens holder. Any liquid collected in sump 34 may be removed by, for example, using a drain tube (not shown) or by dumping the cleaning liquid.

Figure 8:
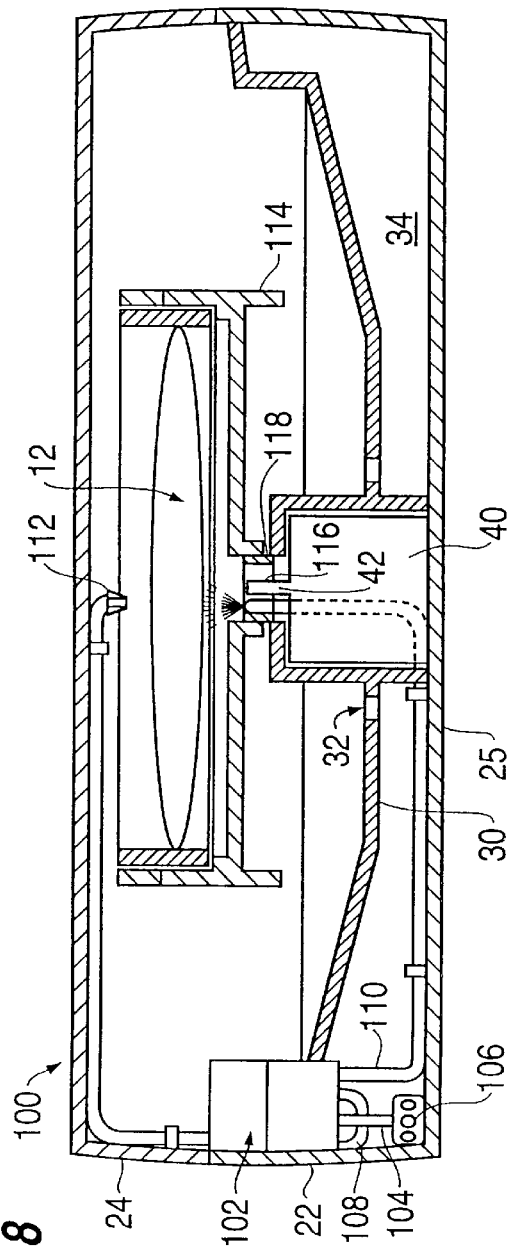
FIG. 8 is a vertical sectional view of an alternate embodiment of the invention.

Referring to FIG. 8, an alternate embodiment of the invention will be described. In this embodiment, the apparatus includes a washing or rinsing cycle in conjunction with a drying cycle similar to that described in the previous embodiment.

The apparatus 100 includes a housing constructed similarly to the housing depicted in FIGS. 1 and 2, wherein like reference numerals identify corresponding components which need not be described again.

In this embodiment, a washing and cleaning cycle is combined with the drying cycle mentioned in the first embodiment, wherein a cleaning or rinsing solution is applied to the opposed surfaces of lens 12. Thus, apparatus 100 includes a pump 102 mounted within base member 22. Associated with pump 102 is an inlet tube 104 extending into sump 34 and having a screening device 106 positioned adjacent bottom wall 25 of base member 22. Inlet tube 104 is in communication with a cleaning or rinsing solution provided within sump 34. Pump 102 draws cleaning solution up through inlet tube 104, and subsequently discharges the solution under pressure through outlet tubes 108 and 110.

Outlet tubes 108 and 110 extend to respective positions within the housing to be adjacent the opposed surfaces of lens 12. Each of the outlet tubes 108 and 110 has a spray nozzle 112 provided at a distal end of the tube for discharging a predetermined spray patten onto the respective surfaces of lens 12. Further, the outlet tubes 108 and 110 typically are positioned so as to discharge cleaning solution onto the opposed lens surfaces at approximately the center of each surface. Thus, the high-speed rotation will disperse the solution entirely over each of the opposed lens surfaces due to centrifugal action, fully washing and cleaning each of the lens surfaces. Further, the discharge of solution onto each of the opposed surfaces of lens 12 may be at a high pressure to facilitate washing of the surface.

As seen in FIG. 8, the positioning of the outlet tubes 108 and 110 may be provided by any suitable arrangement, so long as the cleaning or rinsing solution is discharged onto the approximate center of each lens surface. For example, discharge tube 110 may be positioned relative to the bottom surface of lens 12, so that the solution is introduced to the space between the lens and the lens holder 114. Discharge tube 110 may be in communication with an interrupted annular opening 116 formed in a mounting hub 118, which is mounted for rotation on drive shaft 42 and has lens holder 114 located thereon.

Figure 9:
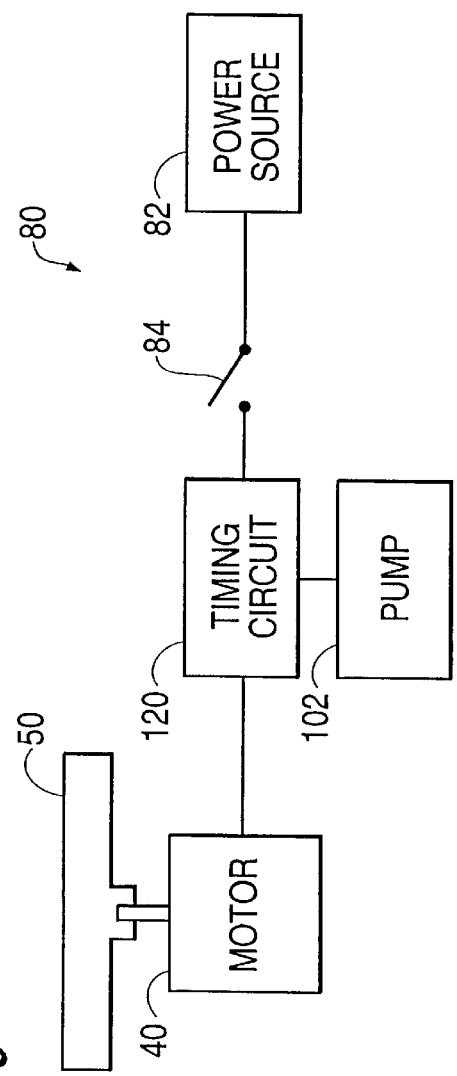
FIG. 9 is a schematic diagram illustrating a control circuit for an apparatus according to an alternative embodiment.

The apparatus includes a further timing circuit 120 as shown in FIG. 9. Timing circuit 120 regulates the operation of motor 40 to control the duration of the high-speed rotation of the motor-drive shaft 42 and lens 12 during a washing cycle. The timing circuit 120 further controls operation of pump 102 to discharge the cleaning or rinsing solution onto the surfaces of lens 12 for a predetermined amount of time during the wash cycle. The timing circuit also controls the operation of a subsequent drying cycle similar to that previously described.

In a preferred mode of operation of this embodiment, the cleaning solution is supplied into sump 34 before the cleaning operation is performed. After lens 12 is placed and retained in lens holder 114 and lid 24 closed, washing, cleaning and drying cycles are initiated by depressing the start button in a manner similar to that previously described. The timing circuit causes motor 40 to rotate lens holder 114 and lens 12 at a high speed. At the appropriate time, pump 102 is activated to discharge a predetermined amount of cleaning or rinsing solution through output tubes 108 and 110 onto the surfaces of lens 12. After application of the solution is completed, the lens 12 typically continues to rotate at a high speed to dry the lens in a manner similar to that previously described. Thus, the lens surfaces are washed, cleaned, and dried so that dust, debris, and other foreign matter is removed from the surfaces. The vent openings 62 allow the cleaning solution to escape from the region between lens 12 and lens holder 114 and into the interior of the housing, or otherwise away from the lens, where it is subsequently drained through openings 12 and returned to sump 34, or simply dispersed and removed from the immediate area of the lens.

Figure 10:
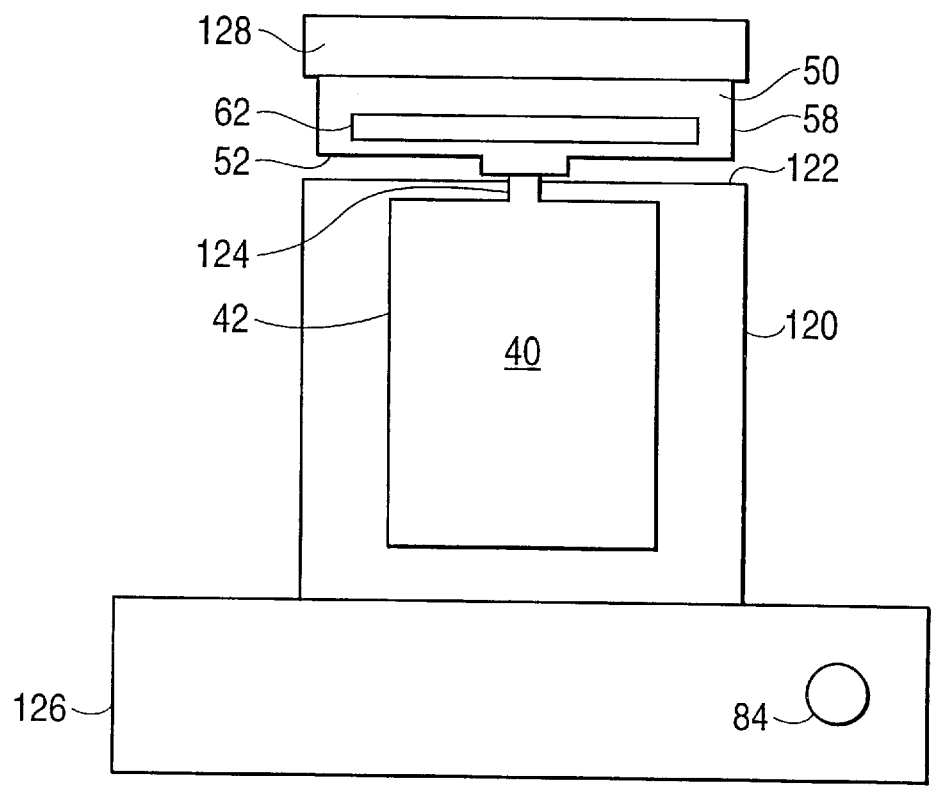
FIG. 10 is a schematic side elevation of another embodiment of the invention.
Figure 10A:
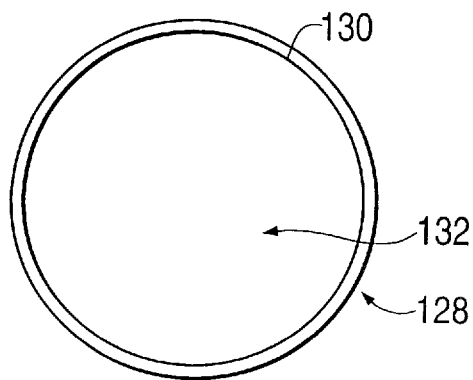
FIGS. 10A and 10B are plan views showing alternative configurations of the cap shown in FIG. 10.
Figure 10B:
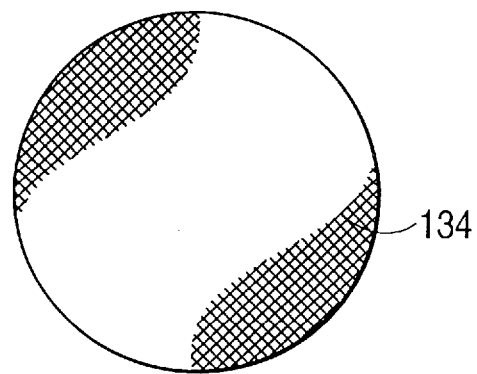

Referring to FIG. 10, there is shown another embodiment of the invention wherein the motor 40 is mounted in a motor housing 120 which has an upper wall 122 provided with an opening 124 through which the drive shaft 42 of the motor projects for being removably connected with a holder 50. Motor housing 120 is mounted on a base 126 that preferably encloses the electronics for operating the motor, for example a timing circuit (not shown) and a switch 84 for controlling connection of the motor to a power source as described in FIG. 9. Holder 50 may be constructed as previously described with a base plate 52, upper annular wall 58 and vent openings 62. Rather than enclosing the entire apparatus in a housing as illustrated in FIG. 1, for example, in this embodiment, only the motor is provided with a housing. Holder 50 may be removably attached to shaft 42. In this embodiment, the holder is additionally provided with a removably attachable cap 128, in the form of a cylindrical ring, which may, for example, have a screw-on connection with the upper end of holder 50. As shown in the plan view of FIG. 10A, cap 128 has an upper end provided with an inwardly projecting flange or ledge 130 that serves to hold in or retain a lens ring disposed in the holder. Flange 130 defines an opening 132 that allows liquid expulsed from the optical component while the holder is rotating during a cleaning operation to be thrown upwardly and outwardly of the holder. FIG. 10B is a plan view of cap 128 showing an alternative arrangement wherein the upper end of the cap is provided with a perforated or screen covering which operates to a hold down the lens ring while allowing liquid to fly out and away from the holder during a cleaning operation.

The invention now being fully described, it will be apparent to one of ordinary skill in the art that any changes and modifications can be made thereto without departing from the spirit or scope of the invention as set forth herein.

What is claimed is:

1. An apparatus for cleaning and drying an optical component having opposed surfaces and an outer peripheral area, comprising:

a rotatable optical component holder for supporting and retaining the optical component at the outer peripheral area so that at least a useful optical area of at least one of the opposed surfaces is fully exposed to air, said holder comprising a base plate and a sidewall extending upwardly from said base plate, said sidewall defining an opening for receiving the optical component and retaining the optical component so that a plane perpendicular to an optical axis of the optical component is in an essentially parallel relationship with said base plate; and drive means coupled to said holder for rotatably driving said holder for centrifugally forcing a liquid from the exposed surface.

2. The apparatus as defined in claim 1, wherein said holder comprises at least one additional sidewall, said sidewalls being circular, concentric and of different diameters.

3. The apparatus as defined in claim 2, wherein said sidewalls are each tapered outwardly away from said base plate.

4. The apparatus as defined in claim 2, wherein said at least one additional sidewall is detachable from said base plate.

5. The apparatus as defined in claim 1, wherein said holder includes at least one vent opening to permit air to flow across an optical component surface facing said base plate.

6. The apparatus as defined in claim 5, wherein said base plate has a circumferential edge adjoining said sidewall, and said at least one vent opening comprises a plurality of symmetrically arranged vent openings adjacent to said circumferential edge.

7. The apparatus as defined in claim 5, wherein said holder includes a movable shutter mounted for adjusting a size of said vent opening to modify the flow of air across the optical component surface facing said base plate.

8. The apparatus as defined in claim 1, wherein said sidewall has a plurality of recesses formed therein to facilitate insertion and removal of the optical component.

9. The apparatus as defined in claim 1, wherein said sidewall frictionally engages the outer peripheral area of the optical component.

10. The apparatus as defined in claim 1, wherein a size of the opening is selected to be larger than a diameter of the optical component.

11. An apparatus for cleaning and drying an optical component having opposed surfaces and an outer peripheral area, comprising:

a rotatable optical component holder for supporting and retaining the optical component at the outer peripheral area so that at least a useful optical area of at least one of the opposed surfaces is fully exposed to air, said holder comprising a base plate having a circumferential edge, a sidewall extending upwardly from said circumferential edge, and means for supporting the optical component in a position above said base plate so that an air space is formed between the optical component and said base plate; and drive means coupled to said holder for rotatable driving said holder for centrifugally forcing a liquid from the exposed surface.

12. The apparatus as defined in claim 11, wherein the drive means comprises a motor having an upwardly projecting drive shaft and the base plate of the holder has a central region defining a downwardly opening recess for removably receiving the drive shaft of the motor.

13. The apparatus as defined in claim 11, further comprising a housing enclosing the motor and having an upper housing wall provided with an opening through which the drive shaft of the motor projects.

14. The apparatus as defined in claim 1, further comprising a housing for enclosing the holder and retained optical component and means disposed in the housing for supplying cleaning solution to the exposed surface of the optical component.

15. The apparatus as defined in claim 14, wherein said means for supplying comprises at least one spray nozzle for spraying the cleaning solution onto the exposed surface.

16. The apparatus as defined in claim 14, wherein said means for supplying is arranged to supply the cleaning solution to a central area of the exposed surface.

17. The apparatus as defined in claim 14, wherein said means for supplying comprises a pump in communication with the cleaning solution.

18. The apparatus as defined in claim 17, further comprising a sump located within said housing for storing and collecting the cleaning solution.

19. The apparatus as defined in claim 1, further comprising a housing for enclosing the holder and retained optical component and a sump located within said housing for collecting cleaning solution applied to the optical component during operation.

20. An apparatus for cleaning and drying an optical component having opposed surfaces and an outer peripheral area, comprising:

a rotatable optical component holder for supporting and retaining the optical component at the outer peripheral area so that at least a useful optical area of at least one of the opposed surfaces is fully exposed to air, wherein the optical component is disposed in a mounting ring and said holder is adapted to receive the mounting ring with the optical component; and drive means coupled to said holder for rotatable driving said holder for centrifugally forcing a liquid from the exposed surface.

21. The apparatus as defined in claim 20, wherein said holder comprises a base plate and a sidewall extending upwardly from said base plate, said sidewall defining an opening for receiving the mounting ring and optical component.

22. The apparatus as defined in claim 21, wherein a size of the opening is selected to be larger than a diameter of the mounting ring.

23. The apparatus as defined in claim 21, wherein the side wall has an inner surface for frictionally engaging the mounting ring for retaining the mounting ring within the holder during rotation of the holder.

24. The apparatus as defined in claim 21, wherein the sidewall has an upper end and the apparatus further comprises a cap in the form of a cylindrical ring having one end including an inwardly projecting flange defining an opening and an opposite end including a connecting means for removably connecting the cylindrical ring to the upper end of the sidewall, the flange retaining the mounting ring in the holder and allowing liquid to be expulsed from the optical component through the opening during rotation of the holder.

25. The apparatus as defined in claim 21, wherein the sidewall has an upper end and the apparatus further comprises a cap in the form of a cylindrical ring having one end including a perforated covering and an opposite end including a connecting means for removably connecting the cylindrical ring to the upper end of the sidewall, the perforated covering retaining the mounting ring in the holder and allowing liquid to be expulsed from the optical component through the perforated covering during rotation of the holder.

26. The apparatus as defined in claim 1, further comprising a housing for enclosing the holder and retained optical component, wherein said housing comprises a lid for covering said holder, said lid having a plurality of perforations formed therein for providing aeration and ventilation to said holder.

27. The apparatus as defined in claim 1, wherein the optical component comprises one of an optical lens and an optical mirror.

* * * * *